US 6,746,190 B2

(12) United States Patent
Freeman

(10) Patent No.: US 6,746,190 B2
(45) Date of Patent: Jun. 8, 2004

(54) TRAILER PNEUMATIC INFLATION SYSTEM AND INFLATABLE AIR BAGS FOR USE THEREWITH

(75) Inventor: Davis D. Freeman, Eau Claire, WI (US)

(73) Assignee: In-Touch Shipping Technology, Ltd., Eau Claire, WI (US)

( * ) Notice: Subject to any disclaimer, the term of this patent is extended or adjusted under 35 U.S.C. 154(b) by 0 days.

(21) Appl. No.: 10/227,775

(22) Filed: Aug. 26, 2002

(65) Prior Publication Data
US 2002/0192045 A1 Dec. 19, 2002

Related U.S. Application Data

(62) Division of application No. 09/711,600, filed on Nov. 13, 2000, now Pat. No. 6,457,921
(60) Provisional application No. 60/165,402, filed on Nov. 13, 1999.

(51) Int. Cl.$^7$ ................................................. B60P 7/08
(52) U.S. Cl. ............................................ 410/119; 410/125
(58) Field of Search .................................. 410/117, 118, 410/119, 125, 155; 141/10, 68, 114, 313; 206/522, 593

(56) References Cited

U.S. PATENT DOCUMENTS

| 2,674,206 A | * | 4/1954 | Scott | 410/119 |
| 2,856,867 A | * | 10/1958 | Dasey | 410/119 |
| 2,960,942 A | * | 11/1960 | Pier et al. | 410/119 |
| 3,067,699 A | * | 12/1962 | Fredricks | 410/119 |
| 3,098,455 A | * | 7/1963 | McElroy et al. | 410/125 |
| 3,115,977 A | * | 12/1963 | Miranda | |
| 3,131,648 A | * | 5/1964 | Seger | 410/119 |
| 3,160,118 A | * | 12/1964 | Newell | 410/119 |
| 3,199,689 A | * | 8/1965 | Feldkamp | 410/119 |
| 3,462,027 A | * | 8/1969 | Puckhates | 410/119 |
| 3,753,414 A | * | 8/1973 | Enochiar | 410/119 |
| 3,847,091 A | * | 11/1974 | Holt | 410/119 |
| 3,915,096 A | * | 10/1975 | Salisbury | 410/125 |
| 4,044,693 A | * | 8/1977 | Ramsey, Jr. | 410/119 |
| 5,466,104 A | * | 11/1995 | Gatwood | 410/156 |
| 5,660,512 A | * | 8/1997 | Elze et al. | 410/124 |
| 5,833,413 A | * | 11/1998 | Cornelius | 410/119 |
| 6,457,921 B1 | * | 10/2002 | Freeman | 410/119 |

FOREIGN PATENT DOCUMENTS

JP          0098563 A   *   4/1990   ................. 206/522

* cited by examiner

Primary Examiner—Stephen Gordon
(74) Attorney, Agent, or Firm—Dicke, Billig & Czaja, PLLC

(57) ABSTRACT

A pneumatic inflation system for use with a freight carrier, such as a tractor-trailer, is provided. The inflation system is available to inflate reusable air bags to cushion freight during shipment from one location to another. In one preferred embodiment, the inflation system includes an air control unit and an air coupler device. The air control unit is fluidly connectable to a compressed air storage reservoir of a tractor-trailer and supplies air to the air coupler device. In one preferred embodiment, the air control unit includes a brake protection valve and a control valve. The brake protection valve substantially disconnects the inflation system from the air storage reservoir in the event that the air pressure of the reservoir drops below a predetermined value, thereby preventing possible failure of the trailer's braking system. The control valve is available for a user to conveniently shut the inflation system off. In another preferred embodiment, the air control unit and the air coupler device are both mounted to the underside of a trailer defined by a front, a back, and opposing sides. The air control unit is positioned in close proximity to the trailer's air storage reservoir, whereas the air coupler device is positioned adjacent one of the sides.

14 Claims, 5 Drawing Sheets

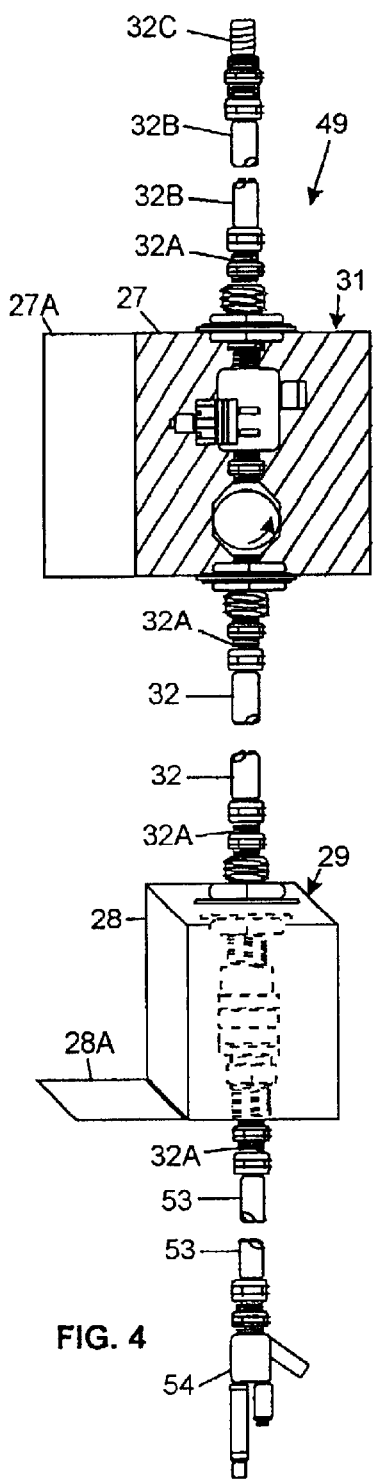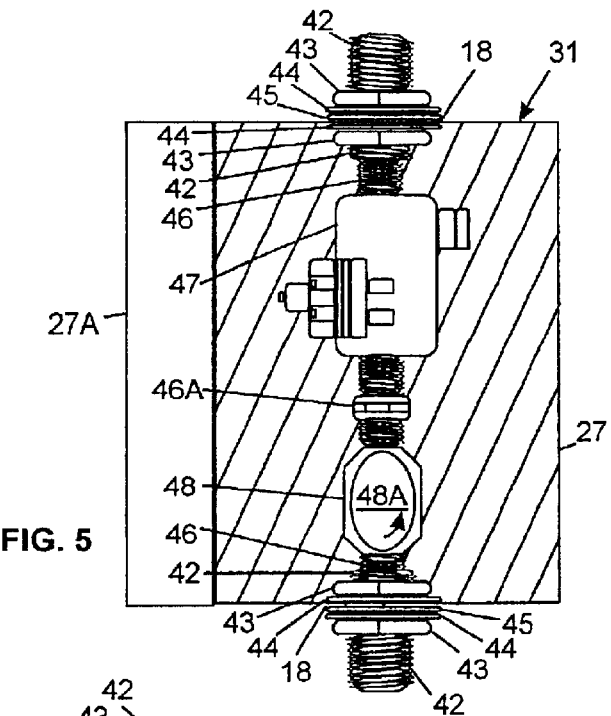
FIG. 5
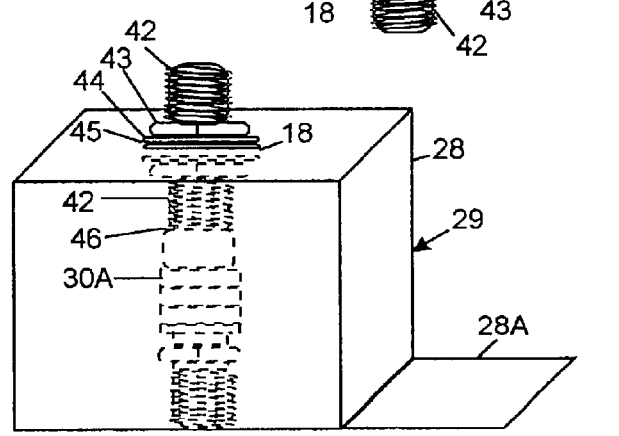
FIG. 6
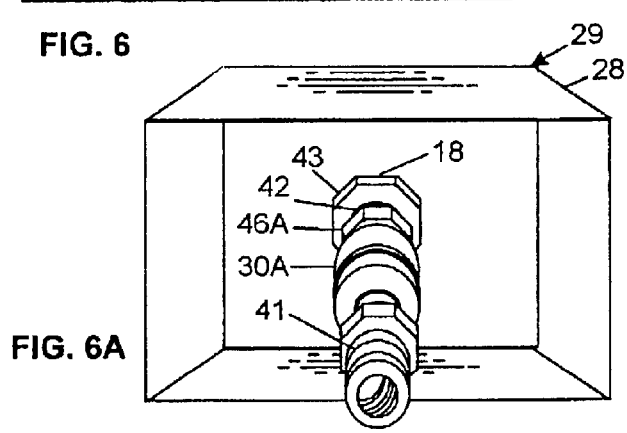
FIG. 6A
FIG. 4

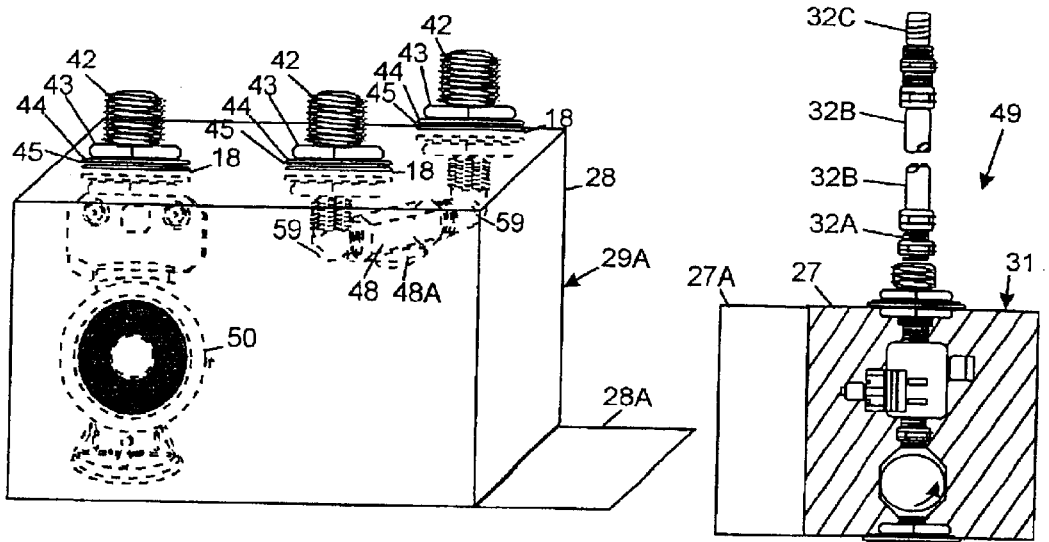
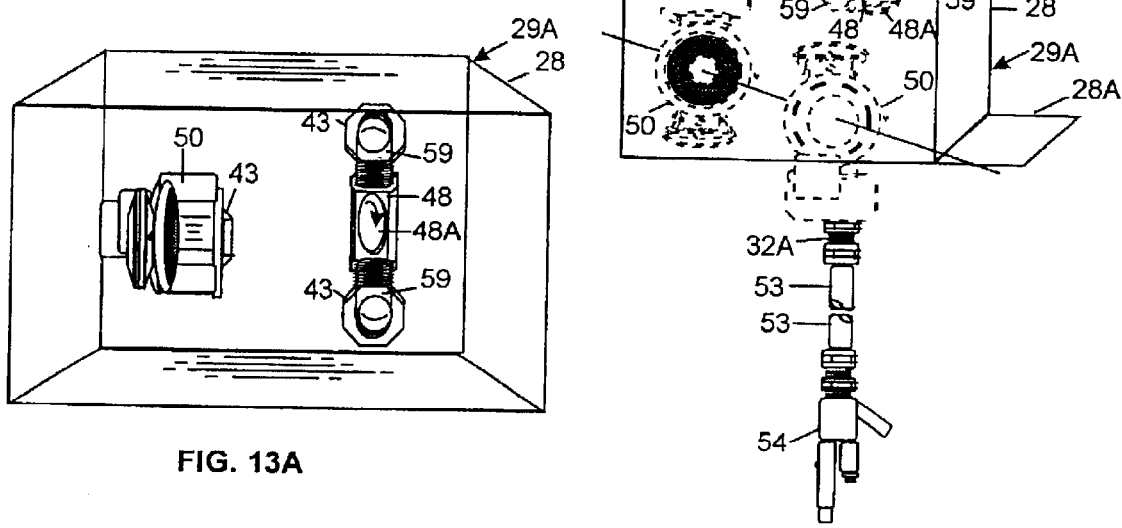
FIG. 13
FIG. 13B
FIG. 13A

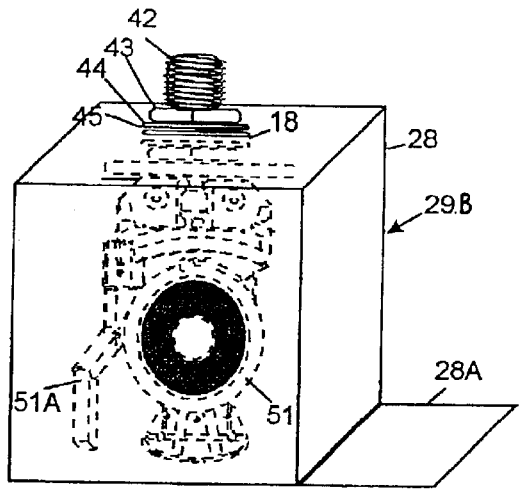
FIG. 14
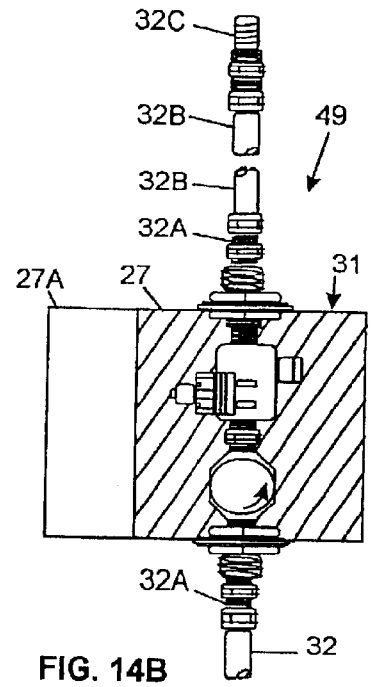
FIG. 14B
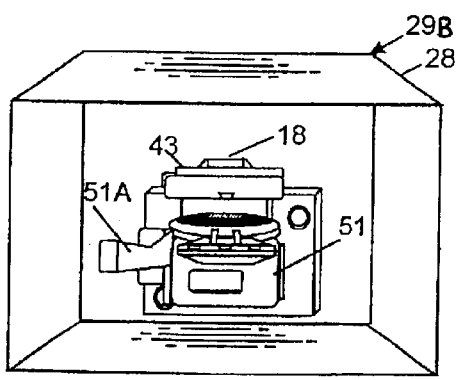
FIG. 14A
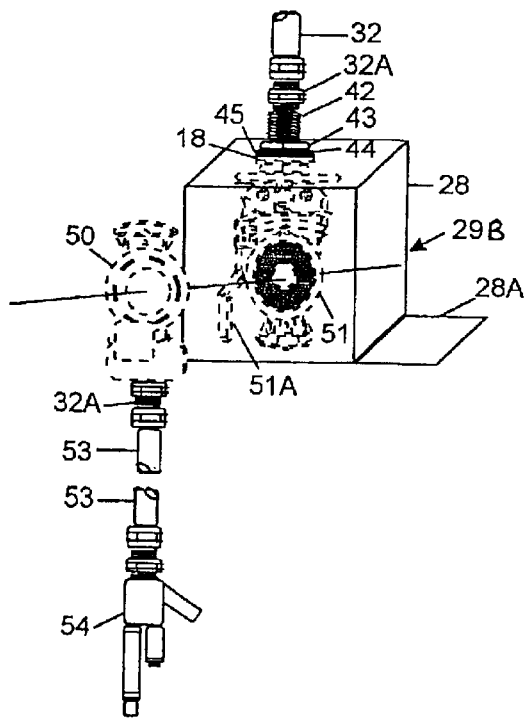

TRAILER PNEUMATIC INFLATION SYSTEM AND INFLATABLE AIR BAGS FOR USE THEREWITH

CROSS REFERENCE TO RELATED APPLICATIONS

This application is a Divisional Application of U.S. application Ser. No. 09/711,600 filed Nov. 13, 2000 now U.S. Pat. No. 6,457,921, issued Oct. 1, 2003, that claims benefit of U.S. Provisional Patent Application Serial No. 60/165,402 filed Nov. 13, 1999.

BACKGROUND

1. Field of Invention

This invention relates to a pneumatic inflation system for use with a freight carrier, such as a tractor-trailer, along with reusable air bags inflatable with the inflation system for bracing freight and cargo during transit, thereby preventing damage to the freight.

2. Description of Prior Art

Transporting large freight over long distances is an integral part of virtually every industry. Trucks, railroad cars, airplanes, ships, etc., are all commonly used to transport goods. In general terms, however, a freight carrier, such as a tractor-trailer, temporarily stores the freight during transport. To this end, freight protection within the carrier has remained unchanged for many years. Damaged freight is considered a part of doing business. With specific reference to tractor-trailers, there are currently three methods used for protection of freight during transit.

One method used is load locks. Load locks protect the load from leaning or falling out of the end of the trailer. Load locks do not protect the entire load from damage. Load locks are cumbersome, difficult to maneuver, heavy and often fail during transit. Another method is the use of low grade, unreliable, one-time use, paper dunnage bags. These bags are used once and then cut up by the user at the destination, generating significant waste. Third, vinyl or plastic inflatable dunnage bags are also used in freight carriers where it is customary to fill the spaces between the cargo, or between the cargo and the walls of the freight carrier, to prevent the cargo from shifting and damaging either the cargo itself, and/or the walls of the freight carrier. These bags are inflated at the shipping dock. Typically, the freight protection is installed/provided when the freight is initially placed into the trailer. Trailer door is shut and the freight protection devices that were installed are expected to withstand the hazards of travel to the destination. Air bags often deflate during transit due to changes in pressure in and outside the trailer as the driver ascends and descends in the mountains. Air bags and other freight protection devices also fail and fall to the floor of the trailer over the rough roads and driver maneuvers. Unfortunately, once the tractor-trailer has left the dock, it is impossible to re-inflate the air bags, as a pressurized air source is no longer available.

SUMMARY

In accordance with one aspect of the present invention, a trailer pneumatic inflation system for use with a freight carrier, such as a tractor-trailer, is provided. The inflation system is available to inflate reusable air bags to cushion freight during shipment from one location to another. In one preferred embodiment, the inflation system includes an air control unit and an air coupler device. The air control unit is fluidly connectable to a compressed air storage reservoir of a tractor-trailer and supplies air to the air coupler device. In one preferred embodiment, the air control unit includes a brake protection valve and a control valve. The brake protection valve substantially disconnects the inflation system from the air storage reservoir in the event that the air pressure of the reservoir drops below a predetermined value, thereby preventing possible failure of the trailer's braking system. The control valve is available for a user to conveniently shut the inflation system off. In another preferred embodiment, the air control unit and the air coupler device are both mounted to the underside of a freight carrier defined by a front, a back, and opposing sides. The air control unit is positioned in close proximity to the carrier's air storage reservoir, whereas the air coupler device is positioned adjacent one of the sides.

In another preferred embodiment, the inflation system is available to inflate a plurality of inflatable bags useful for protecting freight stored within the freight carrier. The inflatable bags are preferably configured to be re-useable and each includes upper and lower latching tabs. These latching tabs are configured to receive a coupling device that secures the respective inflatable bag to the freight. With this configuration, the inflatable bag will not undesirably slide downwardly relative to the freight during transit.

Accordingly, several objects and advantages of the preferred embodiments of the present invention are:

(a) to provide ability for the driver to make adjustments in freight protection during transit from origin to destination;

(b) to provide a trailer pneumatic inflation system in combination with inflatable air bags that can stabilize any type of cargo;

(c) to provide a trailer pneumatic inflation system in combination with inflatable air bags that will reduce driver tension, minimizing concern about shifting of the cargo in any direction;

(d) to provide a trailer pneumatic inflation system in combination with inflatable air bags that is easy and quick to install to stabilize cargo;

(e) to provide a trailer pneumatic inflation system that works secondary to the air braking system;

(f) to provide ability to inflate the air bags from the tractor-trailer;

(g) to provide a fail safe inflation device that ensures protection of the tractor-trailer;

(h) to provide on-board inflatability of air bags;

(i) to provide use of the truck trailers compressed air source (air tank);

(j) to provide continuous freight protection regardless of pressure and temperature changes within and outside the trailer, rough roads and hazardous travel using aligning and safety flaps on the air bags;

(k) to provide freight protection to the entire load;

(l) to provide an appropriate type of air bag suitable to protect the size of freight being hauled;

(m) to provide for a reduction of waste in the transportation industry, providing a reusable inflatable air bag over the one-time use paper air bag; and (n) to provide for reliable freight protection device.

Further advantages are to provide inflatable air bags that can be made from any suitable material of engineering choice, such as plastic, vinyl, paper or the like. Further advantages are' to provide lateral restraint and proper distribution of air bags using aligning flaps that can be fastened to each other using any suitable material of engineering choice such as a bungee cord, rubber band, rope, elastic material or the like. Further advantages are to provide vertical restraint and proper distribution of air bags using safety flaps that can be fastened to freight using any suitable material of engineering choice such as a bungee cord, rubber band, rope, elastic material or the like.

Still further objects and advantages will become apparent from a consideration of the ensuing description and drawings.

BRIEF DESCRIPTION OF THE DRAWINGS

FIG. 4 an enlarged, cross-sectional view of an air control unit and air coupler device of the inflation system of FIG. 3;

FIG. 5 is an enlarged, cross-sectional view of the air control unit of FIG. 4;

FIG. 6 is a side view of the air coupler device of FIG. 3;

FIG. 6A is a perspective view of the air coupler device of FIG. 6;

FIG. 13 is a side, perspective view of an alternative air coupled, including a glad hand;

FIG. 13A is a perspective view of the air coupler device of FIG. 13;

FIG. 13B is a side view of an alternative inflation system in accordance with the present invention, including the air coupler device of FIG. 13;

FIG. 14 is a side, perspective view of an alternative air coupler device, including a glad hand;

FIG. 14A is a perspective view of the air coupler device of FIG. 14;

FIG. 14B is a side view of an alternative inflation system in accordance with the present invention, including the air coupler device of FIG. 14.

DETAILED DESCRIPTION OF THE PREFERRED EMBODIMENTS

Figure 1:
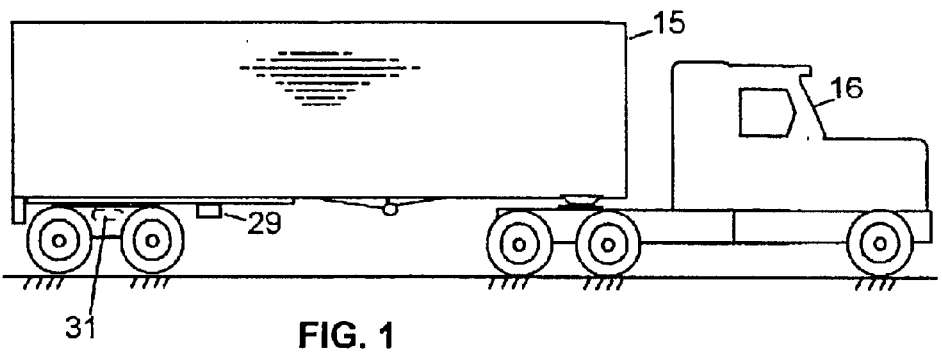
FIG. 1 is a side elevational view of a truck in combination with a semi-trailer and incorporating a trailer pneumatic inflation system in accordance with the present invention.

Referring now to the drawings, wherein like reference numerals designate corresponding structure throughout the views, and referring in particular to FIGS. 1 through 6A a pneumatic inflation system 49 for use with a freight carrier pursuant to a preferred embodiment of the present inventions and FIGS. 13 through 14B pursuant to an alternative embodiment of the present inventions.

Figure 3:
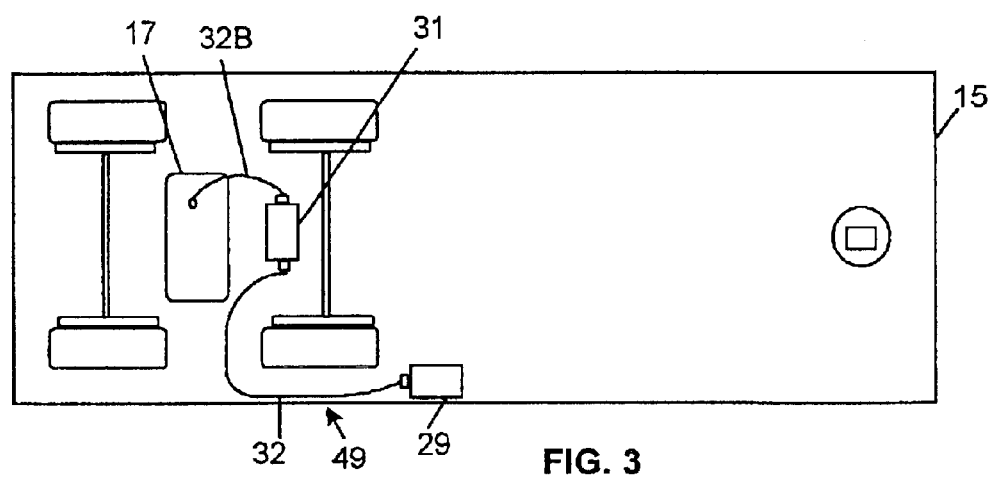
FIG. 3 a bottom view of the trailer of FIG. 1, including the inflation system in accordance with the present invention.

As a point of reference, the inflation system 49 is highly useful with the trucking industry. To this end, FIG. 1 shows a truck 16 in association with a freight carrier or trailer 15. Notably, the inflation system 49 can also be used with other types of freight carriers, such as any other container, cargo space, railroad car, or any other suitable transport container which may also be inside an aircraft or on a ship. By way of example, the instant transport container is intended to be part of a road vehicle. A tractor compressor (not shown) is driven by the truck's 15 engine (not shown) and supplies air to a pressurized air storage reservoir 17 (FIG. 3). Although not shown in the drawings for ease of illustration, air lines pass rearwardly from the tractor compressor too the air storage reservoir 17 through a tractor protection valve to a glad hand between the tractor 16 and trailer 15. As is known in the art, the air storage reservoir 17 is mounted to an underside of the trailer 15, and is normally used to control the trailer's 15 air brake and/or air suspension systems.

Figure 2:
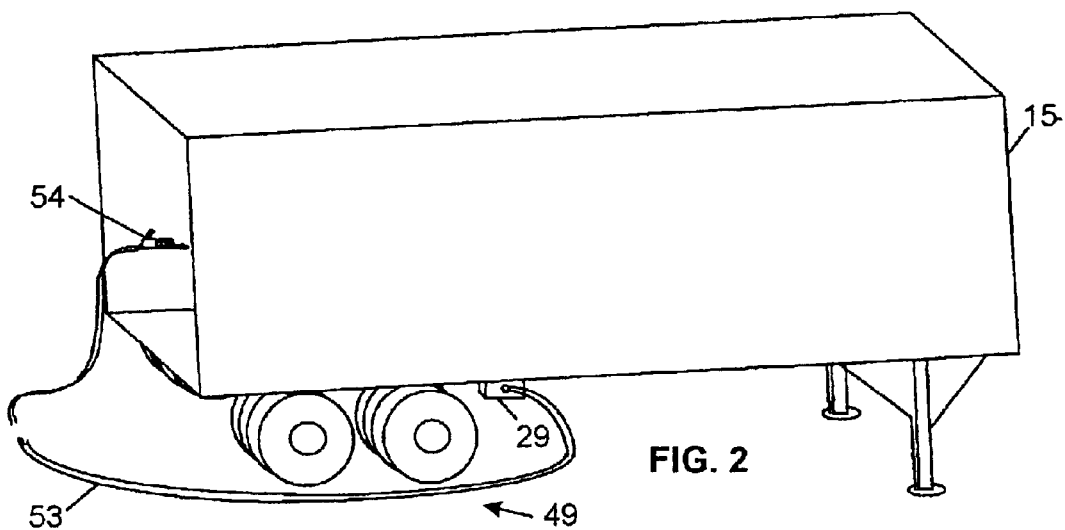
FIG. 2 is a schematic view of the trailer of FIG. 1.

With reference to FIGS. 2 and 3, the inflation system 49 of the present invention preferably includes an air control unit 31, an air coupling device 29 and an air hose 53. The air control unit 31 and the air coupling device 29 are mounted to an underside of the trailer 15 (shown best in FIG. 3), with the air control unit 31 preferably in close proximity to the air storage reservoir 17 and the air coupling device 29 adjacent one of the opposing sides of the trailer 15. The air control unit 31 is fluidly connected to the air storage reservoir 17 by tubing 32B, and supplies pressurized air to the air coupling device 29. The air hose 53, in turn, in fluidly connectable to the air coupling device 29, and is available for inflating or otherwise providing pressurized air to a wide variety of auxiliary components associated with the trailer 15, such as inflatable dunnage bags, pneumatic tools, tires, etc.

The air coupling housing 29 has an air hose adapter to receive the air hose 53 having an externally threaded fitting adapted to be connected to the main passage at the tapped portion of air coupler hosing 29. In a preferred embodiment, the hose 53 terminates at a nozzle apparatus 54 which is preferably in the form of a pistol-shaped nozzle, having a hand grip. Alternatively, the hose 53 can be connected to a wide variety of other devices.

FIG. 3 is an under side view of the trailer 15 incorporating the trailer pneumatic inflation system 49. As previously described, the trailer 15 has the air storage reservoir 17 that, for example, is coupled to an appropriate compressor on the truck 16 (FIG. 1), so that air pressure within the reservoir 17 may be maintained at a particular pressure, for example 120 psi. FIG. 3 shows a position of the air control unit 31 mounted within close proximity to the air storage reservoir 17. As is known in the art, the air storage reservoir 17 has one or more exit ports. An air line or tubing 32B fluidly connects one of these ports, and thus the air storage reservoir 17, to the air control unit 31. So as to minimize the opportunity for damage to the tube 32B, the air control unit 31 is mounted to the trailer 15 as close as possible to the air storage reservoir 17. In a preferred embodiment, then, the tubing 32B has a length less than approximately 12 inches.

The air coupler device 29 is located in the front of a trailer tandem coupled to a floor or slider box of a trailer 15 so that a dockworker in charge of loading a trailer, for example at a loading dock, has control in tapping an air source. To this end, the air coupler device 29 is preferably mounted to the trailer 15 adjacent one of the sides thereof. With this preferred location, the air coupler device is readily accessible by a user for connecting the hose 53 (FIG. 2) thereto. The air control unit 31 is fluidly connected to the air coupler device 29 by an air line or tubing 32.

FIG. 4 is a longitudinal cross-sectional view depicting one preferred embodiment of the pneumatic inflation system 49 in an open position. The air line 32B fluidly connects the air storage reservoir 17 (FIG. 3) to the air control unit 31 (an additional air line 32C may further be provided to complete this fluid connection). The second the air line 32 from the air control unit 31 provides controlled air flow to the air coupler device 29. Finally, the air hose 53 connects to the air coupler device 29 using a compressed air coupling. The air hose 53 is connected to the inflation nozzle apparatus 54, which is preferably in the form of a pistol-shaped nozzle, having a handgrip, supplied with compressed air from the hose 53.

FIG. 5 is an enlarged, sectional view of one preferred embodiment of the air control unit 31. The air control unit 31 preferably includes an enclosure 27, a brake protection valve 47 and a control valve 48. The enclosure 27 of the air control unit 31 is constructed of corrosive resistant and temperature resilient material, such as stainless steel, aluminum, plastic, etc., with a door 27A having a latching mechanism (not shown) that provide a tight seal to keep the weather, road dust, corrosion, salt, debris and other foreign material from entering the enclosure 27. As previously described, the enclosure 27 is configured for mounting in close proximity to the air storage reservoir 17 (FIG. 3) of the trailer 15 (FIG. 3). The enclosure 27 forms openings 18 on each respective end. An externally and internally threaded, tubular shaft 42 is inserted through one (or top, relative to the orientation of FIG. 5) opening 18. On the outside of the enclosure 27, a sealing ring 45, a metal spacer 44, and a nut 43 having a threaded hole, encircle the threaded shaft 42. On the inside of the enclosure 27, a metal spacer 44 and a nut 43 having a threaded hole, encircle the threaded shaft 42. This allows the nuts 43 to be screwed tightly onto the enclosure 27 to provide an airtight seal. One end of a threaded nipple 46 is threaded into shaft 42 within enclosure 27 with another end threaded into the brake protection valve 47.

The brake protection valve 47 controls the flow of air into the pneumatic inflation system 49 and out of an air storage reservoir 17 (FIG. 3). Should the air pressure in the air storage reservoir 17 fall below 60 psi, the brake protection valve 47 will close, ceasing to allow air to pass from the air storage reservoir 17 into the inflation system 49. This will maintain enough air pressure in air storage reservoir for effective braking of the truck 16 and the trailer 15, shown in FIG. 1. Other system shut off pressure values, such as 50 psi or 40 psi, are equally acceptable. A threaded hex nipple 46A is threaded into another (preferably downstream) end of the brake protection valve 47 and one end of the control valve 48. The control valve 48 has an interior opening there through so that when it is aligned with an airline, the control valve 48 is open as shown in FIGS. 4 and 5. When a knob 48A is rotated a quarter turn, the control valve 48 is turned off. Thus, if the second air line 32 shown in FIG. 3 is damaged at any time, an operator of the equipment, dockperson, or other personnel could rotate the knob 48A on the control valve 48 to shut off air completely within the air control unit 31, allowing the air storage reservoir 17 to return and maintain full psi. One end of threaded nipple 46 is threaded into the other side (preferably downstream) of the control valve 48 and into another externally and internally threaded, tubular shaft 42 (lower shaft 42 in FIG. 5). The threaded shaft 42 is inserted through the lower opening 18 in the enclosure 27. On the inside of enclosure 27, a nut 43 having threaded hole and a metal spacer 44 encircle threaded shaft 42. On the outside of the enclosure 27, a sealing ring 45, metal spacer 44, and nut 43 having threaded hole, encircle the lower threaded shaft 42. This allows nuts 43 to be screwed tightly onto enclosure 27 to provide an airtight seal.

During use and in accordance with one preferred embodiment, pressurized air is delivered from the air storage reservoir 17 (FIG. 3) to the air control unit 31. The air control unit 31 effectively defines an inlet (for example, the shaft 42 otherwise connected to the brake protection valve 47). Air flows from the inlet to the brake protection valve 47. Assuming sufficient pressure is present, the brake protection valve 47 allows the air to flow (downstream) to the control valve 48. If the control valve is "open," air flow continues downstream to an outlet defined by the air control unit 31 (for example, the shaft 42 fluidly connected downstream of the control valve 48). Thus, the air control unit 31 is configured to receive pressurized air from the air supply reservoir 17, and selectively allows the air to flow to the air coupler device (FIG. 4), depending upon operational parameters of the air storage reservoir 17 (via, for example, the brake protection valve 47) and manual or operator settings (via, for example, the control valve 48). Alternatively, a number of other designs for the air control unit 31 can be employed to achieve these objectives. For example, the brake protection valve 47 and the control valve 48 can be reversed and/or replaced with other component(s).

FIGS. 6 and 6A are side and perspective views, respectively, of one preferred embodiment of the air coupler device 29. In general terms, the air coupler device 29 includes tubing for receiving air from the air control unit 31 (FIG. 5) and for selective fluid connection to the hose 53 (FIG. 2), along with an enclosure 28. The enclosure 28 is preferably constructed of corrosive resistant and temperature resilient material, such as stainless steel, aluminum, plastic, etc., and includes a door 28A having a latching mechanism (not shown) that provide a tight seal to keep weather, road dust, corrosion, salt, debris and other foreign material from entering the enclosure 28. The enclosure 28 is configured for mounting to the front of a trailer tandems coupled to a floor or slider box of a trailer 15 so that a person in charge of loading the trailer 15 has easy access to the air coupler device 29. The enclosure 28 preferably has one opening 18. An externally and internally threaded tubular shaft 42 is inserted through the opening 18, shown in FIG. 6, and defines an intake port. On the outside of the enclosure 28, a sealing ring 45, a metal spacer 44, and a nut 43 having a threaded hole, encircle the threaded shaft 42. On the inside of the enclosure 28, a metal spacer 44 and nut 43 having threaded hole, encircle threaded shaft 42. This allows nuts 43 to be screwed tightly onto enclosure 28 to provide an air tight seal. One end of a threaded hex nipple 46A is threaded into a downstream end of the shaft 42 within enclosure 28. Another end of the threaded hex nipple 46A is threaded into a female body section 30A of a valve quick disconnect coupling. A stem end (or exit port) of a male half 41 of a valve quick disconnect coupling connects to an air hose 53, shown in FIG. 2.

During use, the air coupler device 29 receives air, at the intake port, from the air control unit 31 when the air control unit 31 is "open". A user then selectively couples the hose 53 (FIG. 2) to the exit port of the air coupler device 29, such that when connected, the air coupler device 29 provides a conveniently accessible source of pressurized air. Thus, a user is not required to crawl under the trailer 15 (FIG. 2) to access the air coupler device 29. Further, by forming the air coupler device 29 to be separately positionable relative to the air control unit 31, the air control unit 31 can be positioned as close as possible to the air storage reservoir 17

(FIG. 3) without impeding the desired convenient access to a source of pressurized air. Notably, were the line 32 between the air control unit 31 and the air coupler device 29 severed or otherwise damage, the brake protection valve 47 (FIG. 5) would automatically shut the inflation system 49 off, so that the air supply reservoir would not drop below a minimum pressure level.

As described in greater detail below, the air coupler device 29 can assume a wide variety of forms other than the one preferred embodiment illustrated in FIGS. 6 and 6A. Regardless, the air coupler device 29 provides a conveniently accessible, pressurized air source for connection to the hose 53 (FIG. 3). The hose 53 can be used for a number of applications, including pneumatic tools, cleaning purposes, etc. In one preferred embodiment, the inflation system 49 is employed to inflate inflatable dunnage bags as described below.

Figure 7:
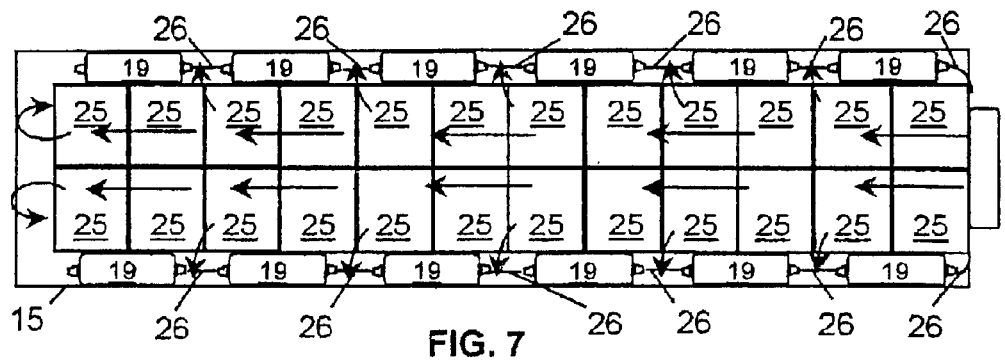
FIG. 7 is a top, schematic view of freight secured within a trailer by inflatable bags in accordance with the present invention.

FIG. 7 is a top view of freight, such as pallets, 25 (twenty four are shown) arranged in a centerline configuration between trailer walls of cargo space and secured by a plurality of centerlining air bags 19 in accordance with the present invention. Arrows indicate a flow pattern of refrigerated air passing within the trailer 15 to cool the freight 25. Narrow voids between walls of the trailer 15 and cartons on pallets 25 arranged two abreast are occupied by the centerlining air bags 19. Bungee cords, rubber bands, ropes or other suitable elastic material 26 are attached to each of the air bags 19 and can be used as guides to ensure proper distribution of the bags 19 within the trailer 15 and provide lateral restraint evenly throughout the trailer 15.

Figure 8:
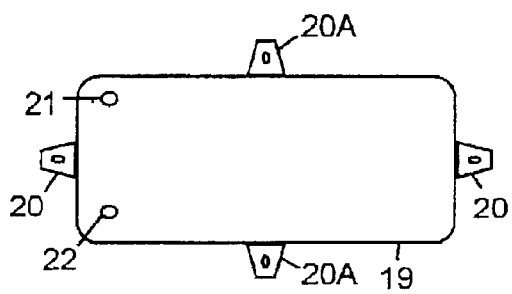
FIG. 8 is a side view of an air bag in accordance with the present invention.

FIG. 8 shows one preferred embodiment of the air bag 19 as being an elongated inflatable reusable sleeve made of durable flexible plastic, rubber elastomeric material (which returns to its original shape) or from inflatable cloth-like material. The air bag 19 preferably includes an inflation valve 22, a deflation or exhaust valve 21, aligning tabs 20 and safety or latching tabs 20A. The aligning tabs 20 are affixed to opposite sides of the air bag 19 and form an opening therein. The safety or latching tabs 20A are affixed to a top and bottom, respectfully, of the bag 19. Bungee cords, rubber bands, ropes or other suitable elastic material 26 (FIG. 7) may be utilized to fasten the bags 19 to each other via the aligning tabs 20 within a cargo trailer 15, where desired, to provide lateral restraint and proper distribution of the bags 19. Further, bungee cords, rubber bands, ropes or other suitable elastic material may be utilized to fasten the bag 19 to the freight 25 within the trailer 15, where desired, to provide vertical restraint and proper distribution the bag 19 between the freight 25 and the trailer 15, as described below.

Figure 9:
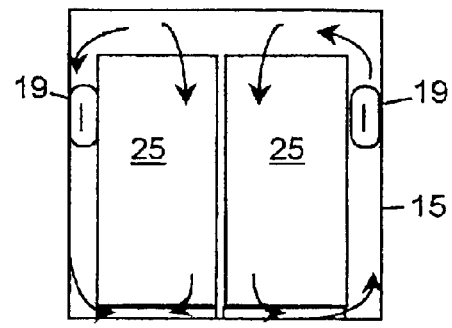
FIG. 9 is a rear view of the tractor-trailer of FIG. 7.

FIG. 9 is a rear view of the trailer 15 with the freight 25 centerlined and secured by the invention. Arrows indicate a flow pattern of refrigerated air. Narrow voids between walls of a truck trailer and cartons on the freight 25 arranged two abreast are occupied by one of the inflatable centerlining air bags 19.

Figure 10:
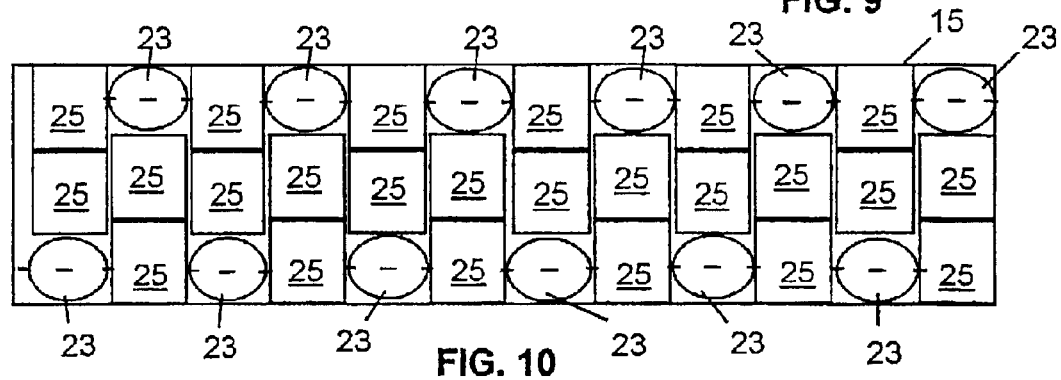
FIG. 10 is a top, schematic view of freight stagger loaded and secured within a trailer.

FIG. 10 is a top view of freight, such as pallets, 25 (twenty four are shown) arranged in a staggered configuration between walls of the trailer 15 of a cargo space and secured by air bags 23. The air bags 23 are highly similar to that previously described, but are under 6 feet in height. Narrow voids between walls of a transport container and cartons on pallets arranged two abreast are occupied by the air bags 23. In accordance with the present invention, lateral shifting of cargo is avoided or reduced by providing a plurality of inflatable air bags 23 or 24 depending upon the height of the cargo.

Figure 11:
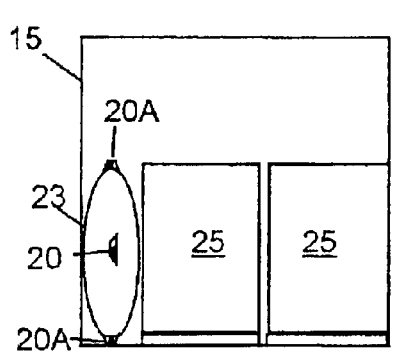
FIG. 11 is a rear view of a tractor-trailer with short cargo secured by inflatable bags in accordance with the present invention.
Figure 12:
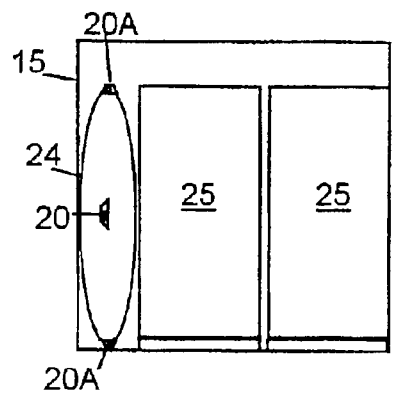
FIG. 12 is a rear view of the tractor-trailer with tall cargo secured by inflatable bags in accordance with the present invention.

FIG. 11 and FIG. 12 show a rear view of the trailer 15 with short palletize cargo 25 and tall palletized cargo 25, respectively, and secured by air bags 23, 24, respectively. Narrow voids between walls of the trailer 15 and the freight 25 arranged two abreast are occupied by inflatable, under six feet tall, air bags 23 (FIG. 11) or over six feet tall air bags 24 (FIG. 12). Selection of the appropriate air bag will depend upon height of the freight 25. In either case, the safety latching tabs 20A are available for securing the bags 23 or 24 to the freight 25, such as with a rope, bungee cord, etc. (not shown). Unlike other available dunnage bags, the safety latching tabs 20A, in conjunction with the coupling device (e.g., rope, bungee cord, etc.), prevents the bag 23, 24 from sliding downwardly during transit.

Returning to FIGS. 1–3, as previously described, the inflation system 49 can assume a wide variety of forms. With specific reference to the air coupler device 29, existing components of the trailer 15, such as a glad hand, can be utilized by, an incorporated into, the present invention. In this regard, FIG. 13 and FIG. 13A are side and perspective views, respectively, of an alternative embodiment air coupler device 29A. The air coupler device 29A includes the enclosure 28 as previously described, tubing, and a glad hand 50. The enclosure 28 preferably has three openings 18. Externally and internally threaded, tubular shafts 42 are inserted through each of the openings 18, as shown in FIG. 13. On the outside of the enclosure 28, a sealing ring 45, a metal spacer 44, and nut 43 having a threaded hole, encircle each of the threaded shafts 42. On the inside of the enclosure 28, a metal spacer 44 and a nut 43 having threaded hole, encircle each of the threaded shafts 42. This allows nuts 43 to be screwed tightly onto the enclosure 28 to provide an air tight seal. One of the shafts 42 is connected to the glad hand 50, while the other two shafts are fluidly connected by a valve plug 48, including elbow nipples 59. The valve plug 48 includes a control 48A for manually opening and closing the valve plug 48.

As shown in FIG. 13B, the air coupler device 29A is fluidly connected to the air control unit 31 at an intake port (defined by one of the tubular shafts 42 as illustrated in FIG. 13B). Air flows from the intake port through the valve plug 48 (which an operator can manually turn on or off). Assuming the valve plug 48 is open, air flows to the glad hand 50, such as by tubing 32. Finally, the glad hand 50 is selectively connectable to the hose 53 (for example, via line 32A) for supplying pressurized air to the hose 53. Glad hands, such as the glad hand 50, are well known in the art. The glad hand 50 serves as the exit port for the air coupler device 29A.

FIGS. 14 and 14A are side and perspective views, respectively, of another alternative embodiment air coupler device 29B. The air coupler device 29B includes an enclosure 28 and a glad hand 51. The enclosure 28 preferably has one opening 18. An externally and internally threaded, tubular shaft 42 is inserted through the opening 18, as shown in FIG. 14A. On the outside of the enclosure 28, a sealing ring 45, a metal spacer 44, and nut 43 having a threaded hole, encircle the threaded shaft 42. On the inside of the enclosure 28, metal spacer 44 and nut 43 having threaded hole, encircle the threaded shaft 42. This allows nuts 43 to be screwed tightly onto the enclosure 28 to provide and air tight seal. Another end of threaded hex nipple 46A is threaded into the glad hand 51. In the embodiment of FIGS. 14 and 14A, the glad hand 51 is of a type known in the art and includes a shut off valve 51A. As is known in the art, the valve 51A can be manually operated to control air flow through the glad hand 51.

As shown in FIG. 14B, the air coupler device 29B is fluidly connected to the air control device 31 for receiving pressurized air therefrom. In this regard, the glad hand 51 provides the intake port, via the tubular shaft 42, for the air coupler device 29B. Further, the glad hand 51 provides the exit port, via the line 32A, for selectively delivering pressurized air to the hose 53 upon connection of the hose 53 to the glad hand 51 and activation of the shut off valve 51A.

While the present invention has been described with reference to the above preferred embodiments and alternative embodiments, it will be understood by those skilled in the art, that various changes may be made and equivalence may be substituted for elements thereof without departing from the scope of the present invention. In addition, modifications may be made to adapt a particular situation or material to the teachings of the present invention without departing from the scope of the present invention. Therefore, it is intended that the invention carrying out this invention, but that the present invention includes all embodiments falling within the scope of the appended claims and their legal equivalents.

What is claimed is:

1. A method of protecting freight carried in a cargo area defined by walls of a freight carrier, the method comprising:
   providing an inflation system secured to the freight carrier;
   providing a plurality of inflatable bags, each of the plurality of inflatable bags defining a top, a bottom, and opposing sides, and including a first latching tab adjacent the top and a second latching tab adjacent the bottom;
   positioning the plurality of inflatable bags against the freight by centering a first one of the plurality of inflatable bags relative to the freight and securing the first inflatable bag to the freight via an attachment device coupled to the first and second latching tabs; and
   inflating the plurality of inflatable bags with the inflation system to cushion the freight.

2. The method of claim 1, wherein providing an inflation system includes fluidly connecting the inflation system to a compressed air storage reservoir otherwise mounted to the freight carrier.

3. The method of claim 2, wherein providing an inflation system further includes fluidly connecting an air control unit adjacent the compressed air storage reservoir, and fluidly connecting an air coupling device to the air control unit, the air coupling device being positioned apart from the air control unit adjacent a side of the freight carrier.

4. The method of claim 3, further comprising:
   automatically discontinuing airflow from the air control unit to the air coupling device when an air pressure within the air control unit drops below 60 psi.

5. The method of claim 1, further comprising:
   providing an available first set of inflatable bags having a height less than 6 feet;
   providing an available second set of inflatable bags having a height greater than 6 feet; evaluating a height of the freight; and
   selecting plurality of inflatable bags from one of the available first and second sets of inflatable bags based upon the evaluation of the freight.

6. The method of claim 1, wherein the freight is initially loaded into the freight carrier at a loading dock, the method further comprising:
   transporting the freight from a loading dock; and
   reinflating one or more of the plurality of inflatable bags with the inflation system at a location remote from the loading dock.

7. A method of protecting freight carried in a cargo area defined by walls of a freight carrier, the method comprising:
   providing an inflation system having an air control unit secured to the freight carrier;
   providing a plurality of inflatable bags;
   positioning the plurality of inflatable bags against the freight;
   inflating the plurality of inflatable bags with the inflation system to cushion the freight; and
   automatically discontinuing inflation when an air pressure within the air control unit drops below 60 psi.

8. A method of protecting freight carried in a cargo area defined by walls of a freight carrier, the method comprising:
   providing a plurality of inflatable bags, each of the plurality of inflatable bags defining a top, a bottom, and opposing sides, and including a first latching tab adjacent the top and a second latching tab adjacent the bottom;
   positioning the plurality of inflatable bags against the freight;
   centering a first one of the plurality of inflatable bags relative to the freight;
   securing the first inflatable bag to the freight via an attachment device coupled to the first and second latching tabs; and inflating the plurality of inflatable bags with an inflation system.

9. The method of claim 8, wherein positioning the plurality of inflatable bags includes:
   positioning the plurality of inflatable bags vertically within the cargo area.

10. The method of claim 8, wherein providing a plurality of inflatable bags includes:
    providing a plurality of inflatable bags each having an inlet valve configured to receive an inflation nozzle of the inflation system.

11. The method of claim 8, wherein providing a plurality of inflatable bags includes:
    providing a plurality of inflatable bags each having an outlet valve for selectively releasing air from the respective inflatable bag.

12. The method of claim 8, wherein inflating the plurality of inflatable bags with an inflation system includes:
    inflating the plurality of inflatable bags with an inflation system secured to the freight carrier.

13. The method of claim 8, wherein centering a first one of the plurality of inflatable bags relative to the freight includes:
    centering a first one of the plurality of inflatable bags relative to the freight by employing a constraining device coupled to at least one of the first latching tab and the second latching tab and to walls of the freight carrier.

14. The method of claim 8, further comprising:
    providing an available first set of inflatable bags having a height less than 6 feet;
    providing in available second set of inflatable bags having a height greater than 6 feet;
    evaluating a height of the freight; and
    selecting a plurality of inflatable bags from one of the available first and second sets of inflatable bags based upon evaluating the height of the freight.

* * * * *

UNITED STATES PATENT AND TRADEMARK OFFICE
CERTIFICATE OF CORRECTION

PATENT NO.   : 6,746,190 B2  
DATED        : June 8, 2004  
INVENTOR(S)  : Davis D. Freeman Page 1 of 1

It is certified that error appears in the above-identified patent and that said Letters Patent is hereby corrected as shown below:

Column 2,  
Line 66, after "are" delete " ".

Column 9,  
Line 58, after "selecting" insert -- a --.

Column 10,  
Line 54, after "tab and" delete "to" and insert -- the --.  
Line 60, after "providing" delete "in" and insert -- an --.

Signed and Sealed this

Twenty-first Day of December, 2004

JON W. DUDAS  
*Director of the United States Patent and Trademark Office*